(No Model.)

A. O. SLENTZ.
WHEEL.

No. 370,714. Patented Sept. 27, 1887.

WITNESSES:
Harry Frease
Chas. R. Miller

INVENTOR
Albertus O. Slentz
BY
W. K. Miller
ATTORNEY

N. PETERS, Photo-Lithographer, Washington, D. C.

UNITED STATES PATENT OFFICE.

ALBURTICE O. SLENTZ, OF CANTON, OHIO, ASSIGNOR TO THE PEERLESS REAPER COMPANY, OF SAME PLACE.

WHEEL.

SPECIFICATION forming part of Letters Patent No. 370,714, dated September 27, 1887.

Application filed May 28, 1887. Serial No. 239,624. (No model.)

*To all whom it may concern:*

Be it known that I, ALBURTICE O. SLENTZ, a citizen of the United States, and a resident of Canton, county of Stark, State of Ohio, have invented a new and useful Improvement in Wheels, of which the following is a full, clear, and exact description, reference being had to the accompanying drawings, making part of this specification.

My invention relates to improvements in wheels, the object of which is to provide a strong yet light wheel, composed of removable parts, as hereinafter described.

A further object of my invention is to provide a wrought-metal or steel-pipe spoke, and the means of removably connecting the spoke to the hub and rim of the wheel.

My invention also relates to the detail and combination of parts as set forth in the claims.

Figure 1:
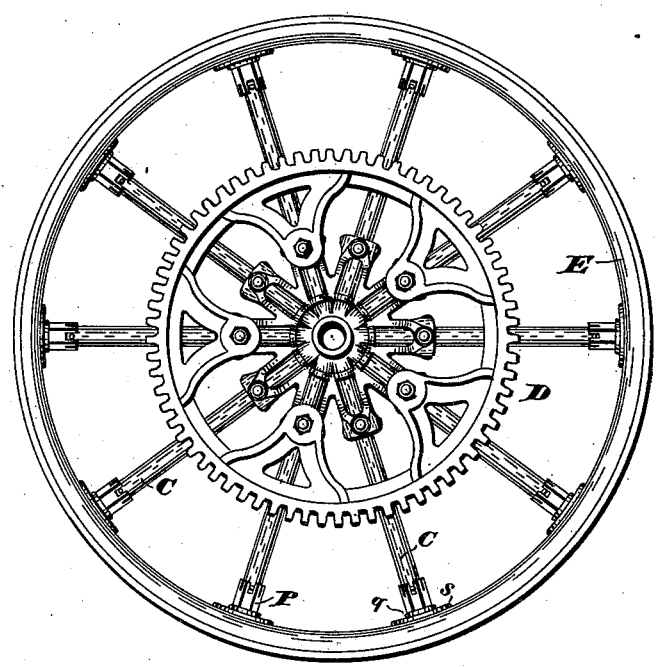
Figure 3:
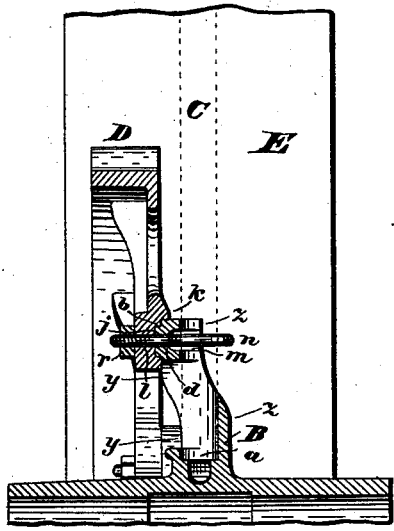
Figure 2:
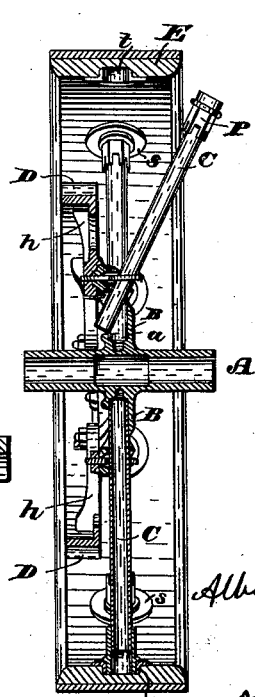
Figure 4:
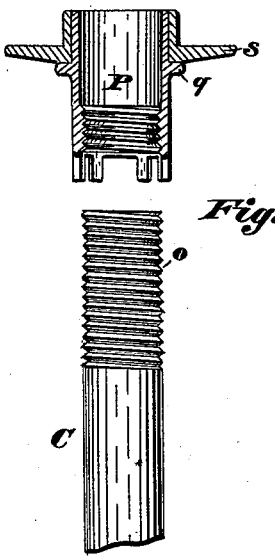

Figure 1 is a side elevation of a wheel, showing my improvements embodied therein. Fig. 2 is a vertical sectional view; Fig. 3, a sectional view of a fragment of the wheel, enlarged. Fig. 4 is a view of the outer end of the spoke and extension-piece.

Similar letters of reference indicate corresponding parts in all of the figures of the accompanying drawings.

Letter A represents the hub-pipe, which may be of such form and size as to adapt it to the required use. About and radiating from said hub there is a series of short spoke-supporting sockets at such intervals as may be desired. As the wheel is especially adapted for the use of a wide rim, it is of advantage to provide for the introduction or removing of the spoke, either in construction of the wheel or for convenience of repairing, as occasion may require, to provide for a lateral movement of the outer end of the spoke the said spoke-sockets are cut away on one side on the outer end from $z$ to $z$, as shown in Fig. 3. On the other side the lower portion is cut away, as from $y$ to $y$, (see same figure,) leaving at the bottom an annular socket, $a$, of such depth as may be desired, to support the end of the spoke C, which, for the purpose of strength and lightness, is made of metal pipe, preferably of wrought-iron or steel.

On the outer end of the spoke C there is an annular thread, $o$, adapted to a similar thread in the extension-piece P. The said piece is provided with an annular collar, $q$, forming a shoulder that rests against a cupped washer, $s$, as shown in Fig. 4, and is provided for the purpose of lengthening or shortening the spoke to center the hub and fix the spoke to the rim and for convenience in removing the spoke, as hereinafter stated.

For the purpose of adapting the wheel to carry and support the gear-wheel D, there is provided on the outer face of the spoke-supporting socket B a boss, $b$, about the perforation $d$. In the arm $h$ of the wheel D there is provided a socket, $j$, and shoulder $k$, and the perforation $l$—the socket $j$ adapted to embrace the boss $b$, the shoulder $k$ to rest on the end of the support B, the perforation $l$ to coincide with the perforation $d$ for the reception of the eyebolt $n$. In the spoke-support there is a semicircular semi-annular groove or recess, $m$, to receive the inner portion of the eyebolt $n$.

To construct the wheel, place the eyebolt $n$ in the perforation in the spoke-support B, the spoke C cut to proper length, and threaded, as stated. Pass the unthreaded end through the eye of the bolt $n$ and down into the socket $a$, having it securely seated therein. Then turn the nut $r$ on the eyebolt and draw the spoke into a fixed position, as shown by the dotted lines in Fig. 3.

On the inner face of the rim E there is provided a series of sockets, $t$, as shown in Fig. 2, at such intervals as may be required, in which the washers $s$ are placed; the extension P is turned onto the spoke C, so as to allow the hub A, with the projecting spokes C, to pass inside of the rim E, the ends of the extension-pieces P being directly in front of and central to the washers $s$, and when so placed the extension-piece is turned so that the thread will carry the end of the piece into the socket $t$, the shoulder $q$ resting on the washer $s$. The hub may be placed in a position central to the rim, and secured there by turning the extension-pieces hard against the washers, and from time to time thereafter the spokes may be adjusted to the rim by turning the extension-pieces either on or off to shorten or lengthen the spoke, or a spoke may be taken out by turning the piece P back onto the spoke and out of the rim, and turning the nut r off the eyebolt n, the spoke can then be repaired or a new one placed therein without interfering with the balance of the wheel. To prevent lateral strain on the bolt n, when the gear-wheel D is required it may be attached by placing the socket k on the end of the arms h over the boss j, the shoulder b resting on the ends of the spoke-support B, the bolt is then passed through the parts, and the nut r turned on, as shown in Fig. 3, thus securing the hub A and wheel D centrally to the rim E.

Having thus fully described the nature and object of my invention, what I claim, and desire to secure by Letters Patent, is—

1. The combination, with a wheel-rim, wheel-hub, and spokes, of spoke-sockets secured to the hub and having their walls cut away, and non-flexible extension-pieces attached to the rim ends of the spokes in longitudinal adjustment thereon, whereby one of the spokes may be removed or adjusted without disturbing the positions of the remaining spokes, substantially as set forth.

2. The combination of a wheel-hub having spoke-sockets cut away on opposite sides to admit of the tilting of the spokes, draw-bolts seated in projected portions of the walls of the sockets, and provided with openings to receive the spokes, and the spokes, substantially as set forth.

3. The combination, with a hub having radiating spoke-supports, the walls of the supports being cut away, substantially as herein described, of a removable spoke having a threaded extension-piece on its outer end, and mechanism located at the spoke-supports for aligning and locking the spokes, substantially as described, and for the purpose set forth.

4. The combination, with a hub having radiating spoke-supports, cut away, as described, and having a boss, b, on one side of said support, of a removable spoke, C, and a gear-wheel, D, having on one face of the inner ends of its arms a socket, k, and an eyebolt, by which the spoke C and the wheel D are secured to the support B, substantially as described, and for the purpose set forth.

5. The combination, in a wheel, of a hub having radiating spoke-supports cut away on one side from z to z and on the other side from y to y, and a socket, a, of the removable spoke C, extension-pieces P, washer s, and rim E, substantially as described, and for the purpose set forth.

6. The combination, in a wheel, of a hub having radiating spoke-supports B, cut away on one side from z to z, and a socket, a, of removable spoke C, extension-piece P, washer s, and rim E, substantially as described, and for the purpose set forth.

In testimony whereof I have hereunto set my hand this 24th day of May, A. D. 1887.

ALBURTICE O. SLENTZ.

Witnesses:
W. K. MILLER,
CHAS. R. MILLER.